United States Patent [19]

Suzuki et al.

[11] Patent Number: 5,084,879
[45] Date of Patent: Jan. 28, 1992

[54] PHASE MATCHING IN HARMONIC LASER APPARATUS INCLUDING A MGO:LINBO₃ CRYSTAL AT ROOM TEMPERATURE

[75] Inventors: Hideo Suzuki; Takashi Suzuki; Yasushi Obayashi, all of Shizuoka, Japan

[73] Assignee: Hamamatsu Photonics K.K., Shizuoka, Japan

[21] Appl. No.: 541,541

[22] Filed: Jun. 21, 1990

[30] Foreign Application Priority Data

Jun. 22, 1989 [JP] Japan .................. 1-160306

[51] Int. Cl.⁵ .............................. H03F 7/00
[52] U.S. Cl. .................................. 372/22
[58] Field of Search ............ 372/21, 22, 347, 75, 372/99; 307/425, 427

[56] References Cited

U.S. PATENT DOCUMENTS

| | | | |
|---|---|---|---|
| 3,621,273 | 11/1971 | Rorden et al. | 307/427 |
| 3,665,205 | 5/1972 | Bridenbaugh et al. | 307/425 |
| 3,858,056 | 12/1974 | Melamed et al. | 372/34 |
| 4,739,507 | 4/1988 | Byer et al. | 372/22 |
| 4,951,294 | 8/1990 | Basu et al. | 372/21 |

OTHER PUBLICATIONS

Oka et al., "Stable Intracavity Doubling of Orthogonal Linearly Polarized Modes in Diode-Pumped Nd:YAG Lasers", Optics Letters, vol. 13, No. 10, Oct. 1988, pp. 805–807.

Kozlovsky et al., "Efficient Second Harmonic Generation of a Diode-Laser-Pumped CW Nd:YAG Laser Using Monolithic MgO:LiNbO3 External Resonant Cavities", IEEE Journal of Quantum Electronics, vol. 24, No. 6, Jun. 1988, pp. 913–919.

Primary Examiner—John D. Lee
Assistant Examiner—Susan S. Morse
Attorney, Agent, or Firm—Finnegan, Henderson, Farabow, Garrett, and Dunner

[57] ABSTRACT

In response to fundamental laser light, a LiNbO₃ crystal emits second harmonic laser light. A phase matching angle of 90 degrees is obtained at room temperature by using a LiNbO₃ crystal doped with MgO at a proper concentration. In the case where fundamental laser light of 1064 nm is applied from a Nd-YAG laser, the concentration of MgO should be about 1.0 mol % or about 7.5 mol %.

11 Claims, 3 Drawing Sheets

PHASE MATCHING IN HARMONIC LASER APPARATUS INCLUDING A MGO:LINBO₃ CRYSTAL AT ROOM TEMPERATURE

BACKGROUND OF THE INVENTION

This invention relates to phase matching in a laser light emitting apparatus that uses a lithium niobate (LiNbO$_3$) crystal as a second harmonic generating crystal.

In performing second harmonic generation (SHG) using a Nd-YAG laser and a LiNbO$_3$ crystal, non-critical phase matching ($\theta=90°$) is desired since the best physical properties are expected at that point. However, since it has been impossible to attain non-critical phase matching at room temperature, a temperature matching method has conventionally been employed in which a LiNbO$_3$ crystal is heated. In this method, to obtain non-critical phase matching, the LiNbO$_3$ crystal is placed in an oven and its temperature is adjusted to achieve uniform heating of the crystal.

With the LiNbO$_3$ crystal, the walkoff angle $\rho$ is given by the following formula:

$$\rho \approx \tan\rho = \frac{n_\omega^o}{2}\left(\frac{1}{(n_{2\omega}^e)^2} - \frac{1}{(n_{2\omega}^o)^2}\right)\sin 2\theta_m$$

where $n_\omega^o$: refractive index for fundamental ($\omega$) ordinary light;
$n_{2\omega}^o$: refractive index for second harmonic ($2\omega$) ordinary light;
$n_{2\omega}^e$: refractive index for second harmonic ($2\omega$) extraordinary light; and
$\theta_m$: phase matching angle. This formula shows that $\rho$ is approximately zero when $\theta_m=90°$. Hence, the effective SHG length corresponds to the crystal length.

The allowance angle $\delta\theta$ is given by the following equation:

$$\delta\theta = \sqrt{\frac{\lambda_\omega}{2l(n_{2\omega}^o - n_{2\omega}^e)}}$$

where l: crystal length; and
$\lambda_\omega$: wavelength of a fundamental wave.
Substituting $\Delta n = n_{2\omega}^o - n_{2\omega}^e = 0.0998$, $l=10$ mm and $\lambda_{107}=1$ μm into this equation, we obtain $\delta\theta=22$ mrad = 1.26°. Since the fundamental wave incident on the crystal with a beam divergence smaller than this value will take part in SHG, the fundamental wave can be focused by a lens so that it is effectively launched into the crystal.

If the phase matching angle $\theta_m$ is 80°, $\rho$ is approximately 0.36° and $\delta\theta$ is 0.17°. The value of $\rho$ is not significant in practical applications, but if $\delta\theta$ is small, high efficiency of SHG is not attained even if the incident light is focused by a lens.

Since phase matching at $\theta=90°$ is possible by controlling the temperature of the LiNbO$_3$ crystal, the current practice has been to heat the crystal in an oven. However, this causes the problem that a large oven is necessary to heat the entire crystal uniformly.

A KTP (Potassium Titanyl Phosphate) crystal is suitable for SHG using an LD-pumped Nd-YAG laser. However, KTP crystals are synthesized by a hydrothermal or flux crystal growth method, either of which takes about one month and is therefore costly.

SUMMARY OF THE INVENTION

An object, therefore, of the present invention is to realize phase matching at 90° using an SHG crystal that is less expensive than KTP and without temperature adjustments.

According to the invention, a laser light emitting apparatus comprises:
fundamental laser means for emitting fundamental laser light;
a LiNbO$_3$ crystal doped with MgO at such a concentration that a phase matching angle of 90 degrees is obtained, for emitting harmonic laser light in response to the fundamental light; and
means for inputting the fundamental laser light from the fundamental laser means into the LiNbO$_3$ crystal at a predetermined incident angle.

If it is supposed that fundamental laser light from a Nd-YAG laser oscillating at 1064 nm is launched into the LiNbO$_3$ crystal, second harmonic light is emitted from said crystal. In order to attain the phase matching at $\theta=90°$, the amount of MgO with which the LiNbO$_3$ crystal is to be doped is properly controlled in accordance with the present invention. Stated specifically, the phase matching at $\theta=90°$ can be attained for the fundamental Nd-YAG laser light of wavelength 1064 nm if the LiNbO$_3$ crystal is doped with about 1.0 mol % or about 7.5 mol % MgO.

DETAILED DESCRIPTION OF THE PREFERRED EMBODIMENTS

Embodiments of the present invention are described below with reference to the accompanying drawings.

Figure 1:
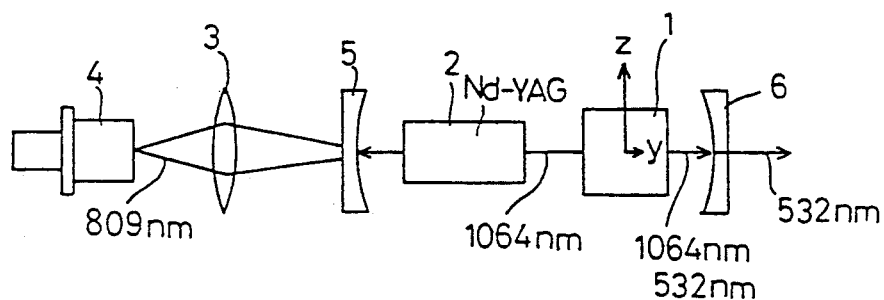
FIG. 1 is a schematic representation of a laser light emitting apparatus according to an embodiment of the present invention.
Figure 3B:
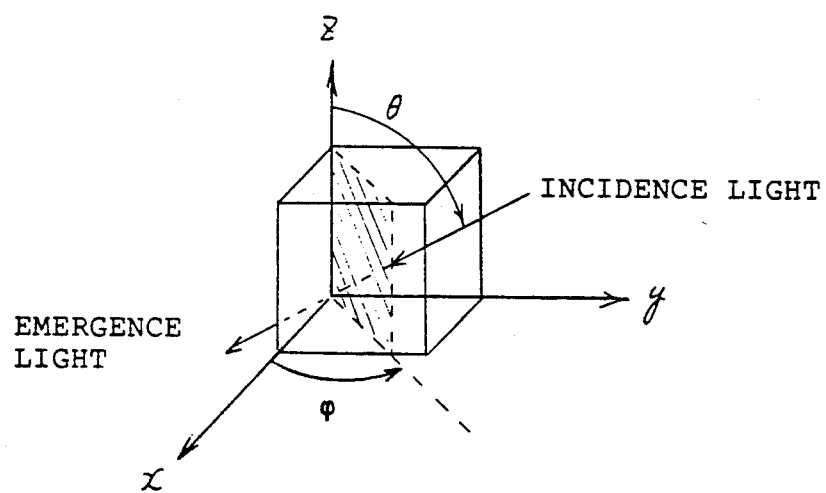
FIGS. 3(a) and 3(b) are representations of a manner in which a laser beam is launched into and emitted from a LiNbO$_3$ crystal.
Figure 3A:
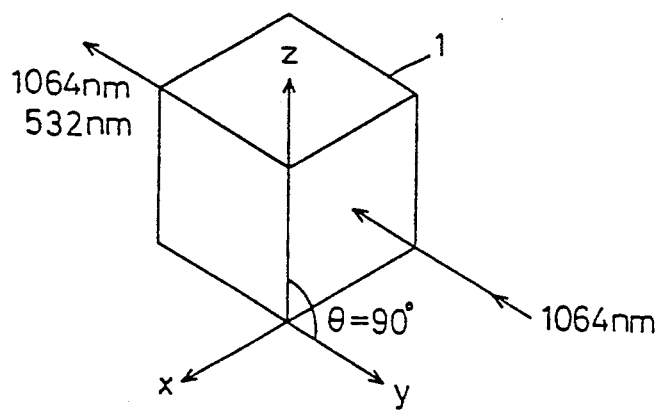

FIG. 1 is a schematic representation of a laser light emitting apparatus according to an embodiment of the present invention, in which a crystal of MgO-doped LiNbO$_3$ is indicated by numeral 1. If it is supposed that fundamental light at 1064 nm from a Nd-YAG laser 2 is launched into the LiNbO$_3$ crystal 1 along the y-axis as shown in FIG. 3(a), both fundamental light (1064 nm) and second harmonic light (532 nm) are emitted from the exit end of the crystal 1.

The reason why the incidence of the fundamental light along the y-axis was assumed above is explained as follows. In describing phase matching in SHG, the incident direction of the fundamental light to the crystal is expressed by, as shown in FIG. 3(b), an inclination angle $\theta$ from the z-axis and an inclination angle $\phi$ from the x-axis in the x-y plane. According to the paper "Nonlinear Optics", Philip G. Harper and Brian S. Wherrett, Academic Press Inc., the effective nonlinear coefficient $d_{eff}$ of LiNbO$_3$ in the type-II phase matching is expressed as:

$$d_{eff} = d_{15}\sin\theta - d_{22}\cos\theta\sin 3\phi$$

where the relationship $|d_{15}| = -|d_{22}|$ holds. Therefore, the maximum $d_{eff}$ is obtained if $\phi = 30°$ or $\phi = -90°$. However, since the present invention deals with the case of $\theta \simeq 90°$, the second term of the above equation of $d_{eff}$ becomes zero and therefore the value of $\phi$ does not influence $d_{eff}$.

The efficiency of SHG can be improved by controlling the amount of dopant MgO in the LiNbO$_3$ crystal so as to attain phase matching at $\theta = 90°$. For growth of the LiNbO$_3$ crystal doped with MgO at, e.g., 4.5 mol %, the corresponding concentration of MgO is added to the materials for the LiNbO$_3$ body crystal, and the crystal is grown by the Czochralski process. In practice, however, the concentration of MgO incorporated into the resultant crystal will not necessarily coincide with that in the material state, and hence some adjustment is needed.

Figure 2:
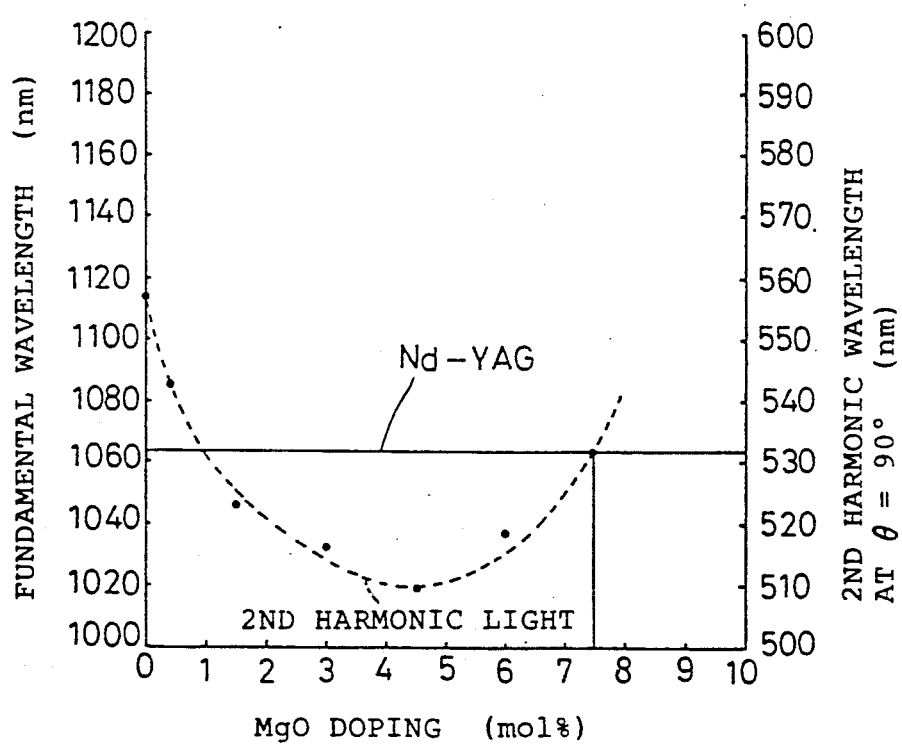
FIG. 2 is a graph showing the relationship between the concentration of dopant MgO and second harmonic wavelength.

The relationship between the amount of dopant MgO and the wavelength for phase matching at $\theta = 90°$ is as shown in FIG. 2, from which one can see that phase matching at $\theta = 90°$ can be attained for the fundamental light (1064 nm) from the Nd-YAG laser 2 when the LiNbO$_3$ is doped with about 1.0 mol % or about 7.5 mol % MgO.

In order to increase the output power density, a lens 3 may be inserted as shown in FIG. 1 to condense the pumping light. This also contributes to a further increase in the efficiency of second harmonic generation.

Shown by numeral 4 in FIG. 1 is a pumping light generator, and 5 and 6 are reflecting mirrors constituting a resonator.

Figure 4:
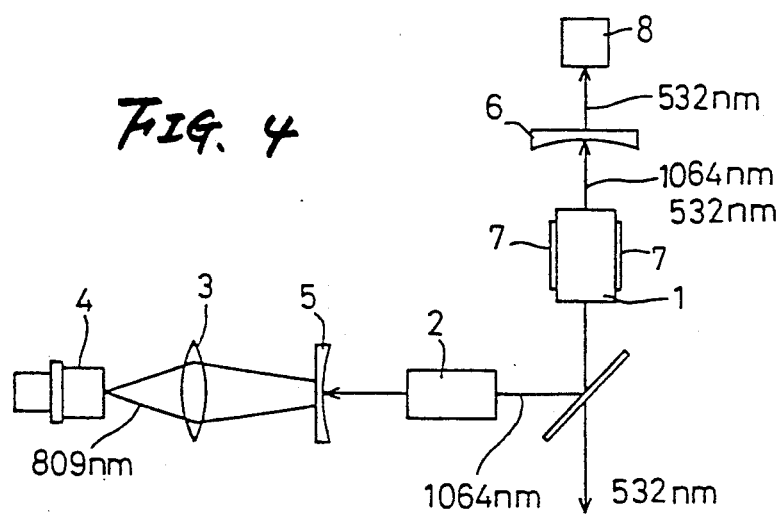

FIG. 4 shows another embodiment of the present invention in which the use of MgO-doped LiNbO$_3$ crystal 1 to obtain second harmonic light at 532 nm is combined with temperature control in order to produce a more precise output. As shown, a Peltier device 7 is provided on both sides of the MgO-doped LiNbO$_3$ crystal 1. About one percent of the second harmonic light at 532 nm from the crystal 1 is transmitted through the reflector mirror 6 and detected with a detector 8. The resulting detection signal is used to perform temperature control on the Peltier devices 7 so that phase matching is attained at $\theta = 90°$.

Figure 5:
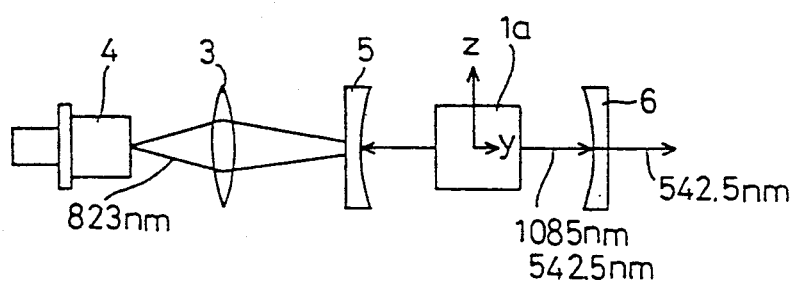
FIGS. 4 and 5 are schematic representations of other embodiments of the present invention.

FIG. 5 shows still another embodiment of the present invention, in which a Nd:MgO:LiNbO$_3$ crystal 1a is continuously oscillated being pumped with laser means at 823 nm. Since a second harmonic wave is also generated at the same time in this crystal (self-SHG), this embodiment has the advantage that only one crystal suffices to obtain both fundamental and second harmonic waves.

In the first and second embodiments described above, the light at 1064 nm from the Nd-YAG laser is used as fundamental light, but other solid-state lasers may of course be employed as exemplified by a Nd-YLF laser that operates at 1053 nm, a Nd-glass laser at 1062 nm, a Nd-BEL laser at 1070 nm, and a Nd-YAP laser at 1064.5 nm, 1072.5 nm and 1079.5 nm. A gas laser such as a Cu-vapor laser that operates at 1021.2 nm may also be used as a fundamental light generator.

The laser light emitting apparatus of the present invention offers the following advantages: (1) By adjusting the amount of MgO with which the crystal of LiNbO$_3$ is doped, phase matching at $\theta = 90°$ can be achieved and the improvement of the efficiency of SHG is realized; (2) the LiNbO$_3$ crystal is less expensive than the KTP crystal; and (3) a self-SHG solid-state laser light emitting apparatus can be constructed using the Nd:MgO:LiNbO$_3$ crystal.

What is claimed is:

1. A laser light emitting apparatus comprising:
    fundamental laser means for emitting fundamental laser light;
    a LiNbO$_3$ crystal doped with MgO at such a concentration that a phase matching angle of 90 degrees is obtained at room temperature, for emitting harmonic laser light in response to the fundamental light; and
    means for inputting the fundamental laser light from the fundamental laser means into the LiNbO$_3$ crystal at a predetermined incident angle.

2. The apparatus according to claim 1, wherein the harmonic laser light is second harmonic laser light.

3. The apparatus according to claim 1, wherein the fundamental laser means is a solid-state laser selected from the group consisting of a Nd-YAG laser, a Nd-YLF laser, a Nd-glass laser, a Nd-BEL laser and a Nd-YAP laser.

4. The apparatus according to claim 1, wherein the fundamental laser means is a Cu-vapor laser.

5. The apparatus according to claim 1, wherein the fundamental laser means and the LiNbO$_3$ crystal are provided within a resonator.

6. The apparatus according to claim 2, wherein a Nd:MgO:LiNbO$_3$ crystal is used as a self-second-harmonic generating crystal.

7. The apparatus according to claim 3, wherein the fundamental laser means is the Nd-YAG laser which operates at a wavelength of 1064 nm, and the concentration of MgO is about 1.0 mol % or about 7.5 mol %.

8. A phase matching method in a laser light emitting apparatus, comprising the steps of:
    preparing a LiNbO$_3$ crystal doped with MgO at such a concentration that a phase matching angle of 90 degrees is obtained at room temperature;
    generating fundamental light; and
    inputting the fundamental light to the LiNbO$_3$ crystal at a predetermined incident angle; whereby harmonic laser light is emitted from the LiNbO$_3$ crystal with the phase matching angle of 90 degrees.

9. The method according to claim 8, wherein the harmonic laser light is second harmonic laser light.

10. The method according to claim 9, wherein a Nd:MgO:LiNbO$_3$ crystal is used as a self-second-harmonic generating crystal.

11. The method according to claim 8, wherein the fundamental laser light is laser light emitted from a Nd-YAG laser and having a wavelength of 1064 nm, and the concentration of MgO is about 1.0 mol % or about 7.5 mol %.

* * * * *